United States Patent [19]

Karpenko

[11] 4,408,636
[45] Oct. 11, 1983

[54] REHEATER ISOLATION DEVICE AND CHEMICAL CONNECTOR

[75] Inventor: Anatole N. Karpenko, San Francisco, Calif.

[73] Assignee: Anchor/Darling Valve Company, San Mateo, Calif.

[21] Appl. No.: 407,792

[22] Filed: Aug. 13, 1982

[51] Int. Cl.³ .................. F16L 55/10; F16L 55/16
[52] U.S. Cl. ............................. 138/94; 138/89; 138/92
[58] Field of Search ............ 138/89, 92, 94, 94.5

[56] References Cited

U.S. PATENT DOCUMENTS

| | | | |
|---|---|---|---|
| 2,165,228 | 7/1939 | Cornell | 138/94 X |
| 3,598,154 | 8/1971 | Brundage | 138/94.3 |
| 3,991,791 | 11/1976 | Luckenbill | 138/94 |

Primary Examiner—James E. Bryant, III
Attorney, Agent, or Firm—Robert Slick

[57] ABSTRACT

A combination reheater isolation device and chemical connector is provided which is particularly adapted for use on lines leading to and from the reheater in a boiler-turbine plant system wherein the device can be used under normal system working conditions as a normal T-type fitting, wherein it can be modified to accept a chemical connector attachment for use in chemical cleaning and flushing and wherein the device also serves as an isolation device for hydrotest purposes. The device of the present invention employs relatively few parts and these are rugged and easy to assemble and disassemble.

2 Claims, 9 Drawing Figures

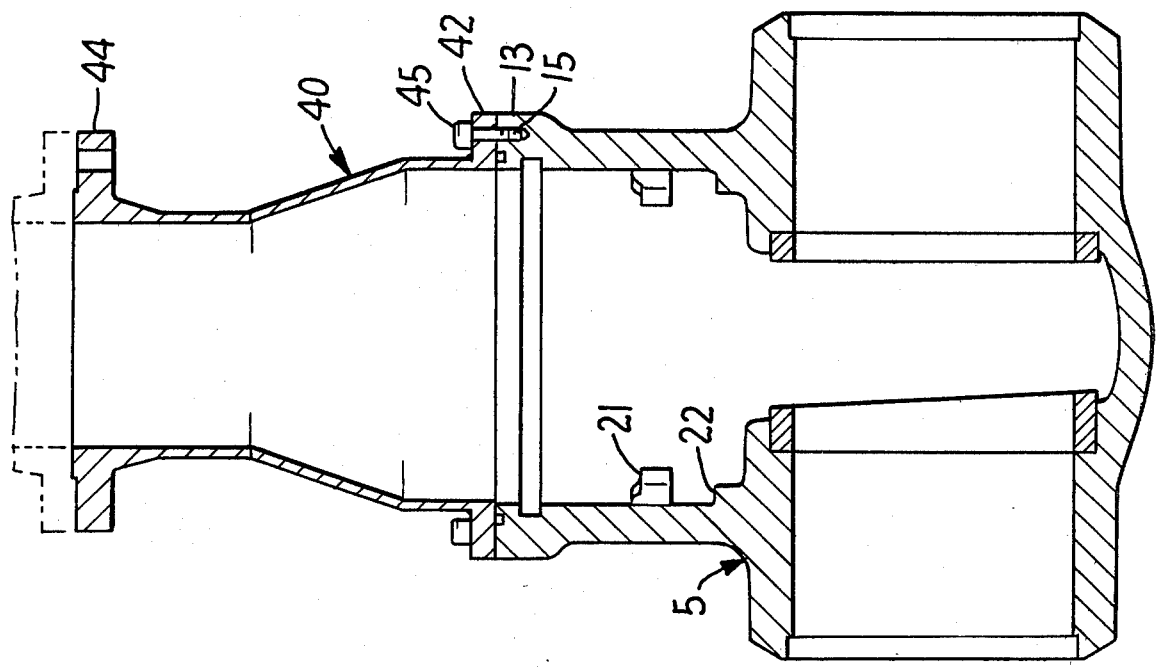
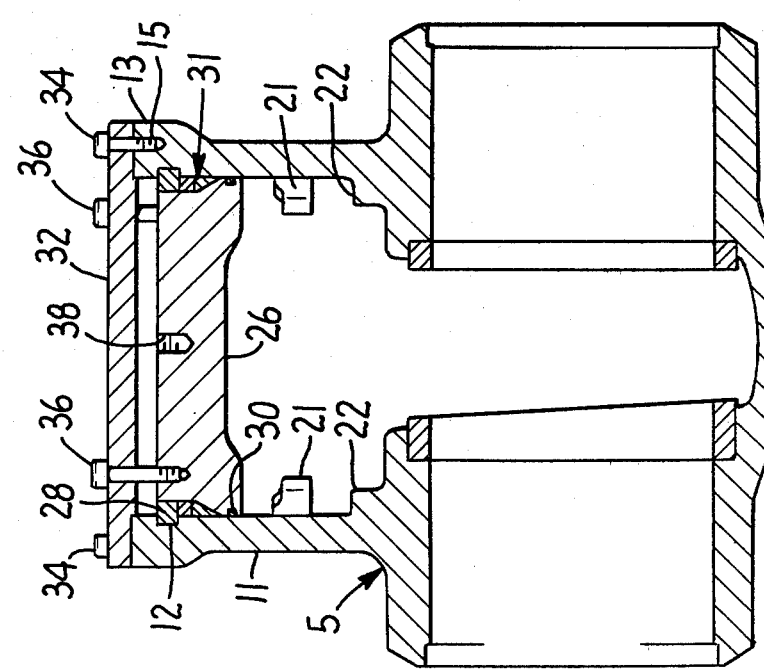

REHEATER ISOLATION DEVICE AND CHEMICAL CONNECTOR

SUMMARY OF THE INVENTION

In a boiler-turbine plant, a reheater is normally employed between the high pressure turbine and the intermediate pressure turbine, and it is necessary from time to time to clean the tubes in the reheater and to test the reheater under pressure. In the past, this was done by isolating the tubes from the pipeline by mechanically forcing a blind flange between two flanges welded into the line. It has been proposed to obviate the necessity of forcing the blind flange into the line by providing a reheater isolation device on the cold and hot reheat lines. However, the devices heretofore proposed have not been satisfactory in service and have frequently failed. For one thing, the prior art devices have employed a number of relatively small fragile parts making assembly and disassembly quite complicated and also leading to failure because of the weakness of the parts.

In accordance with the present invention, a combination reheater isolation device and chemical connector is provided which is simple in structure, which is rugged and which does not require any welding since it can be left permanently in the hot and cold reheat line wherein, during normal operation, it serves merely as a connector and does not degrade the operation of the plant in any manner.

However, the device of the present invention, in addition to acting as a simple connector between two lines, also serves as an attachment point for a chemical connector when it is desired to use chemicals to clean or flush the system. Two embodiments are shown, one for chemical connectors of roughly the same size as the line and another embodiment where a large isolation device, e.g. 20 inches, is used with a relatively small chemical connector, e.g. 4 to 6 inches.

The device of the present invention also has a third mode wherein it serves as an isolation device for the hydrotest of the system. This last point is particularly important since it is not necessary to trust the turbine intercept valve to isolate the intermediate pressure turbine on the hot side of the reheater. Thus, the possibility of injuring the turbine or damaging the intercept valve is obviated by the device of the present invention.

Summing up the above, the present invention supplies a three-way device of simple and rugged construction which serves as a conduit, as a chemical cleaning connector and as an isolation device. Other features of the invention will be brought out in the balance of the specification.

BRIEF DESCRIPTION OF THE DRAWINGS

FIG. 2 is a section showing the device used as a straight-through connector.

FIG. 3 is a similar connection showing the device in use as a chemical connector.

DESCRIPTION OF THE PREFERRED EMBODIMENTS

Figure 1:
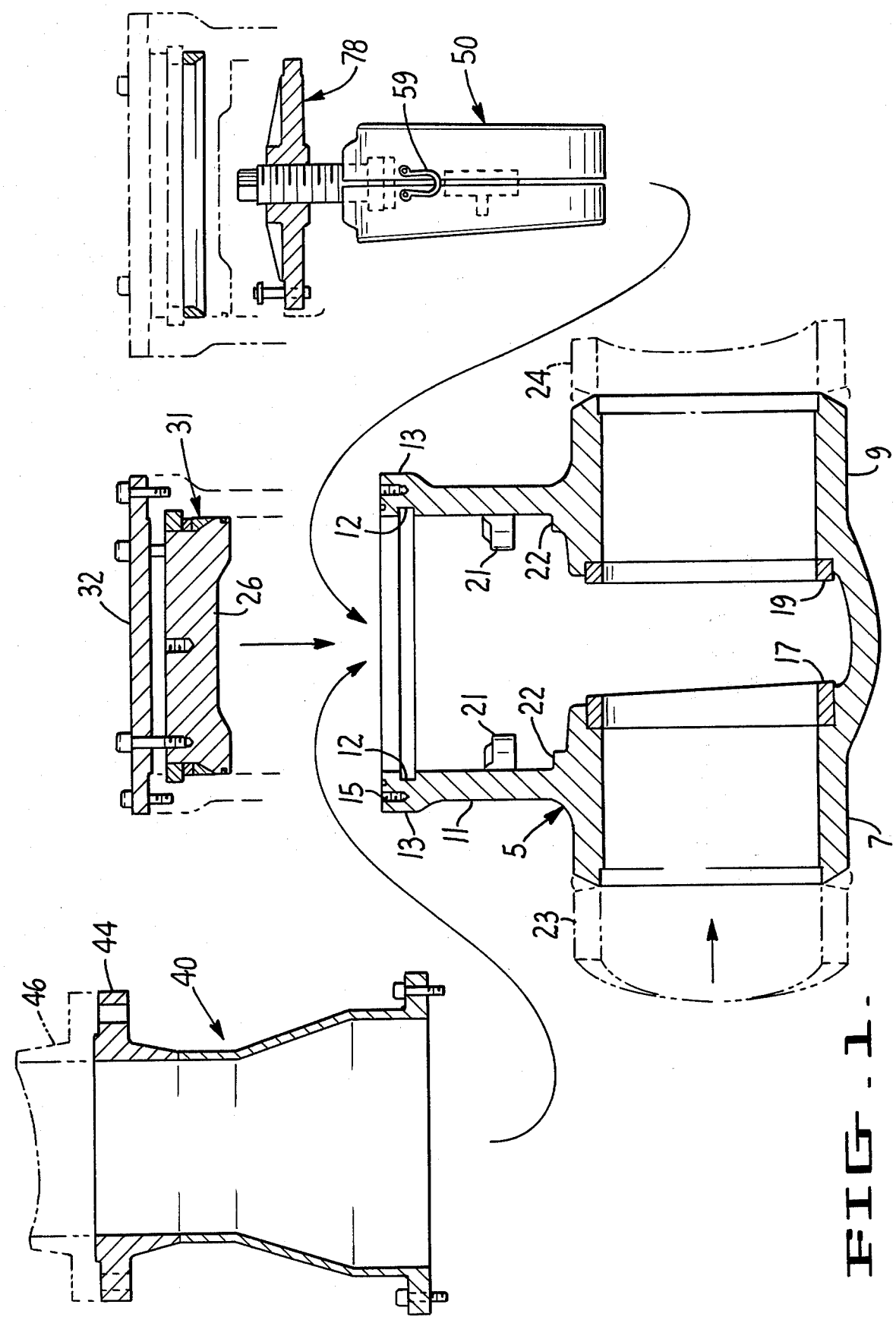
FIG. 1 is an exploded sectional view of a device embodying the present invention illustrating its three modes of operation.

Referring now to the drawings by reference characters, the combination device of the present invention has the following parts which are common to all modes of operation. The device has a body, generally designated 5, having an inlet arm 7 and an outlet arm 9 with a side arm or T connection 11. Arm 11 has a flange 13 at the top thereof which has a plurality of threaded holes 15. Both the inlet 7 and outlet 9 are provided with angling valve seats 17 and 19 respectively. The side arm 11 has inwardly extending upper lugs 21 and lower lugs 22, each suitably four in number. It also has an internal annular recess 12.

The parts thus far described are in the line at all times as is indicated by the connection shown in phantom at 23 and 24.

Figure 7:
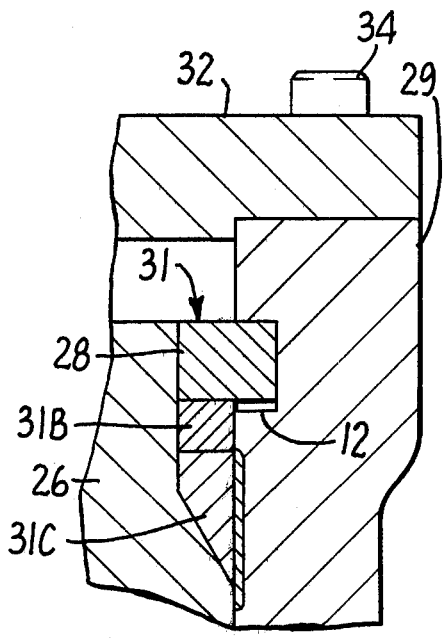
FIG. 7 is an enlarged, fragmentary section of a typical bonnet sealing arrangement.

For normal operation, the structure shown at the center of FIG. 1 and in more detail in FIG. 2 is employed. In this configuration, the side arm 11 is provided with a tight-fitting bonnet 26 which has a segmented retaining ring 28 at the top thereof which engages recess 12 and the top of the bonnet 26, an O ring 30, and a seal generally designated 31, later described in detail. Although bonnet 26 is retained by segmented ring 28, it is not tight fitted. The actual seal is produced by the pressure seal, generally designated 31, and not by O ring 30. The details of the seal 31 can best be seen with reference to FIG. 7. The side wall 29 has a slot 12 therein and a bonnet-retaining ring 28 fits into this slot as well as the cutout space in bonnet 26. A gasket retaining ring 31B holds the tapered gasket 31C which is a soft steel silver plated wedge-shaped pressure seal gasket which is deformed outwardly against the body ensuring an effective seal. A cover plate 32 is held in place with the cap screws 34. Studs 36 extend downwardly into bonnet 26 which help hold the bonnet securely in place. The center of bonnet 26 is threaded as at 38 so that a pull rod can be screwed into the bonnet when it is desired to pull the bonnet out. This is the normal mode of operation of the connector while a plant is operating, and it will be seen that no constriction whatsoever has been placed on the steam line so that the connector of the present invention may be left permanently in place and will not cause a pressure drop.

When it is desired to employ the device of the present invention as a chemical connector, the configuration illustrated on the left hand side of FIG. 1 and in FIG. 3 is employed. For this purpose a reducing adapter 40 is employed having a lower flange 42 adapted to mate with flange 13 and an upper flange 44 which is adapted to mate with a line at 46, shown in phantom, leading to a suitable source of a chemical cleaning solution. In use, one merely removes cover plate 32 and pulls out bonnet 26. One can now attach adapter 40, as is shown in FIG. 3, employing suitable cap screws 45 which fit into the threaded openings 15 which were previously described as holding the cover plate in place.

Figure 5:
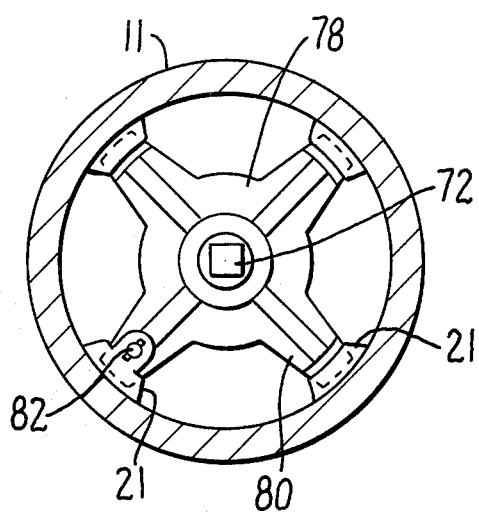
FIG. 5 is a section on the line 5—5 of FIG. 4.
Figure 4:
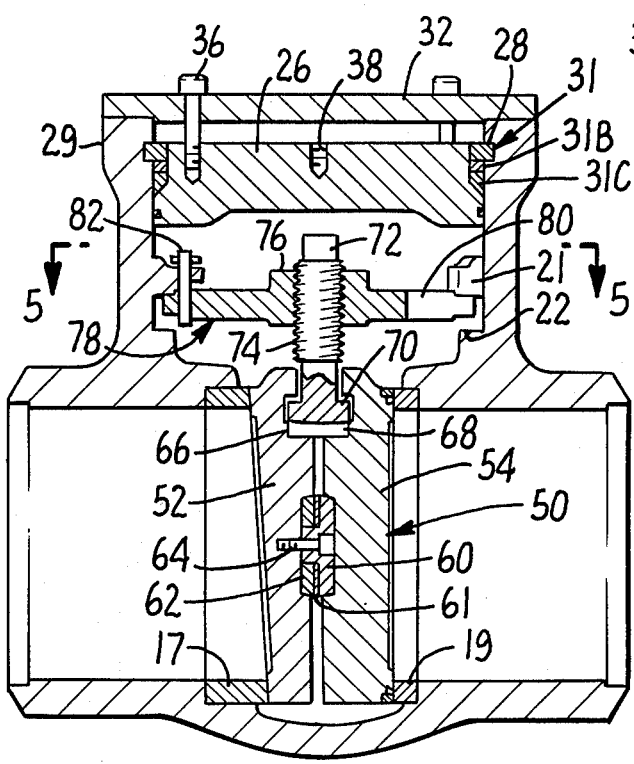
FIG. 4 is a similar section showing the device in use for the isolation of the system and for hydrotesting.
Figure 6:
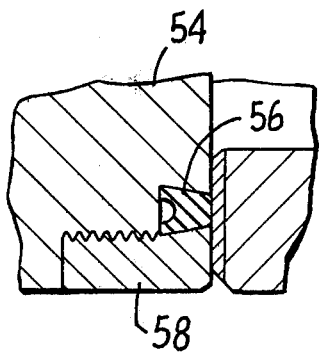
FIG. 6 is an enlarged, fragmentary section of the soft seal of the split disc valve illustrating how complete isolation is achieved.

After a cleaning operation or other maintenance procedure, it is usually required that the line be blocked for a hydrotest. In order to block the line, the structure shown at the right hand side of FIG. 1 and in FIGS. 4–6 is employed.

On the inner surface of the side arm 11 are the four lugs 21, previously described. Further, there was previously described the angling valve seats 17 and 19 located in the main line. In order to block line 9, one employs the split disc assembly, generally designated 50. The split disc assembly includes two half discs, namely a plain disc 52 and a sealing disc 54. Plain disc 52 is at 85° to the port's center line and disc 54 with resilient seal 56 is at 90°. Naturally, these are manufactured to conform to the V-shaped opening between the seats 17 and 19. "U" shaped springs 59 on each side of the assembly (only one side shown) retain the halves together until they are inserted in the "V" opening between the seats. Disc 54 is provided with a resilient seal ring 56 held in place by a retaining ring 58. This seal ring 56 forms a tight fit with the valve seat 19. Disc 52 is not provided with a seal since it is used only for wedging. The two half discs 52 and 54 are centered by means of the two centering washers, namely a male washer 60 and a female washer 62, with a cap screw 64 holding the two washers, and thus the discs, in centered relationship. These centering washers 60 and 64 have an outside configuration which is spherical and fit mating spherical counterbores with discs to facilitate self-alignment. These washer assemblies are provided with spacer shims 61 for position adjustment of the disc resilient seal 56 in the center of the valve seat 19, and also to compensate for manufacturing errors, accumulation of tolerances or wear. The two discs have recesses 66 and 68 at their respective tops and washer 70 fits into the cavity thus formed. Washer 70 forms a part of a gag 72 having an acme thread 74 and is mounted in a threaded boss 76 of spider 78 which has arms 80 corresponding in number and placement to the lugs 21. Spider 78 is prevented from turning by means of pins 82 which fits in one of the arms 80 and one of the lugs 21. Thus, when one wishes to block the line, it is only necessary to insert split disc assembly 50 and tighten it in place against lugs 21 by suitably positioning the spider and turning gag 72. The upper lugs 21 are used when one wishes to block the line by inserting the split disc assembly with spider 78 and tightening gag 72. The lower lugs 22 are used for removal of the disc assembly when the device is used as a straight-through connector. As a safety precaution, one can now return the bonnet 26 and cover 32 and associated parts.

Figure 8:
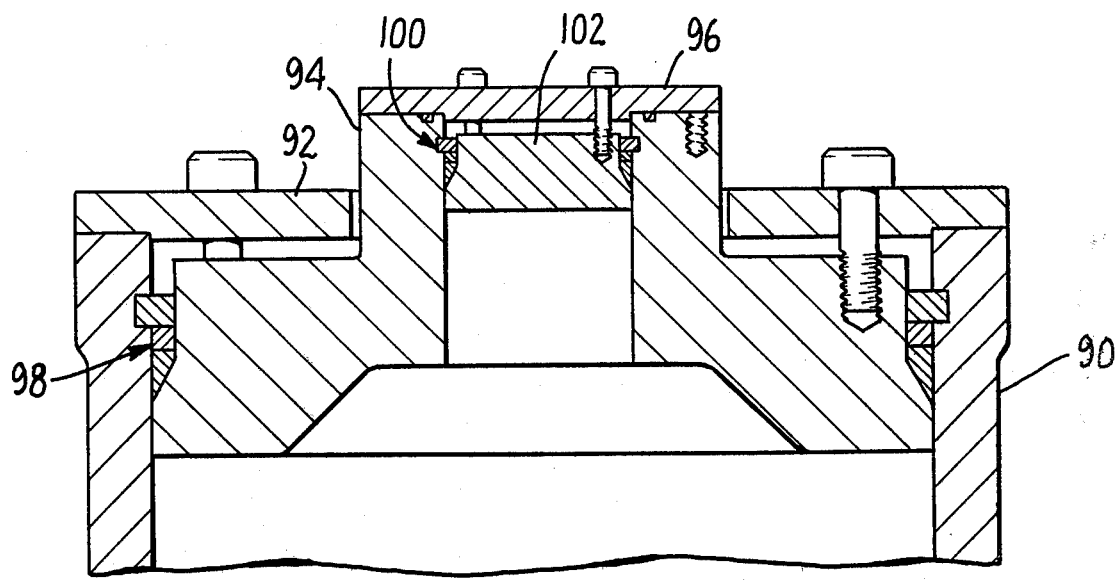
FIG. 8 is a sectional view of a sealing arrangement with reducer when it is desired to employ a relatively small chemical connector with a relatively large isolation device.
Figure 9:
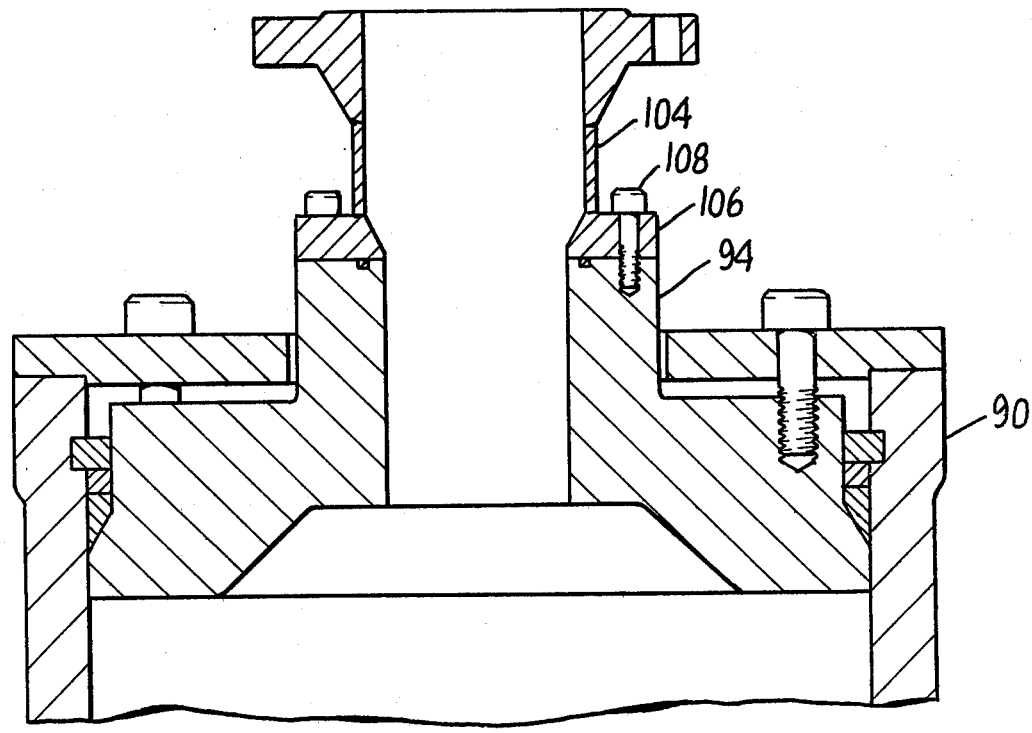
FIG. 9 is a section similar to FIG. 8 showing a chemical connector of reduced size in place.

For isolation devices which are large in size, it is frequently desirable to provide for the use of a chemical connector of substantially smaller size. For instance, the isolation device might be 20 or even more inches in diameter, yet it would be desirable to be able to connect this in a relatively small chemical inlet such as from 4 to 6 inches. This will allow connection of a chemical cleaning nozzle without dismantling the large bonnet joint. A suitable structure for this application is shown in FIGS. 8 and 9.

In these figures, the side arm 90 is provided with a top plate 92 which holds a reducing bonnet 94 which has a second top plate 96. Seals 98 and 100 are provided and these are essentially the same as the seal designated 31 and shown in detail in FIG. 7. The inner bonnet 102 fits into the reducer 94 as shown and is held as previously described. When it is desired to use the chemical cleaner, the top plate 96 and inner bonnet 102 are removed and an adapter 104 is attached to the side arm 94 by means of a flange 106 on the adapter held in place by studs 108 passing into the side arm 94. In this manner, one may employ a relatively small chemical connector on a wide variety of isolation devices including isolation devices several times the diameter of the chemical connector.

Although specific embodiments of the invention have been described, many variations can be made in the structures shown without departing from the spirit of this invention.

I claim:

1. A combination pipe coupling, clean out and isolation device comprising in combination:
    a. a "T" fitting having opposite arms adapted to couple two pipes together in end-to-end relationship,
    b. a side arm extending at right angles to said arms, said side arm having a terminal end,
    c. valve seats in each of said opposite arms, said seats being set at an angling relationship to each other, forming a "V" shaped opening therebetween with the open side of the "V" facing said side arm,
    d. an annular, internal recess in said side arm,
    e. a sealing plate forming part of said combination, said sealing plate being adapted to be placed in said side arm and held in place by ring segments fitting into said recess and said plate,
    f. a flange at the terminal end of said side arm, said flange being adapted to fasten to a clean out connector,
    g. internal, inwardly extending projections within said side arm,
    h. complementary split disc halves fitting into said "V" shaped opening between the valve seats,
    i. a spider engaging the underside of said projections, and
    j. screw means carried on said spider, said screw means engaging said split disc halves and forcing them into sealing relationship with said valve seats.

2. The device of claim 1 wherein at least one of said disc halves has a soft seal at the edge thereof.

* * * * *